United States Patent [19]

Nowicki et al.

[11] Patent Number: 4,752,206
[45] Date of Patent: Jun. 21, 1988

[54] TAKE-OUT ASSEMBLY FOR BLOW MOLDING MACHINE

[75] Inventors: Witold Nowicki, Canton, Mich.; Joe N. Carr, Toledo, Ohio

[73] Assignee: Johnson Service Company, Milwaukee, Wis.

[21] Appl. No.: 34,646

[22] Filed: Apr. 6, 1987

[51] Int. Cl.[4] .............................................. B29C 49/70
[52] U.S. Cl. .................................. 425/537; 198/471.1; 425/539; 425/540; 425/541
[58] Field of Search ............... 425/504, 522, 532, 537, 425/539, 540, 541; 414/744 B; 198/408, 471.1

[56] References Cited

U.S. PATENT DOCUMENTS

| 1,887,211 | 11/1932 | Mortimer | 198/471.1 |
| 3,981,667 | 9/1976 | Bilodeau | 425/539 |
| 4,050,574 | 9/1977 | Chenevard et al. | 198/471.1 |
| 4,397,625 | 8/1983 | Hellmer et al. | 425/540 |
| 4,614,018 | 9/1986 | Krall | 414/744 B |
| 4,680,000 | 7/1987 | Nowicki et al. | 425/504 |

Primary Examiner—Jay H. Woo
Assistant Examiner—C. Scott Bushey
Attorney, Agent, or Firm—Harness, Dickey & Pierce

[57] ABSTRACT

An improved take-out assembly for removing workpieces from a blow molding machine particularly adapted for blow molding machines having a continuously rotating turn table which rotates about a horizontal axis. The take-out assembly includes a turntable with a plurality of extending pick-up units having suction cup type engaging pads at their ends. Rotation of the take-out assembly turntable is coordinated with the blow molder turntable such that a suction cup pick-up unit is positioned to engage a workpiece at the desired work station. The pick-up units are radially movable to extend and retract to provide clearance during rotation and to properly engage the workpiece at the discharge station. A rotary timing valve is used to conduct a vacuum source to the individual pick-up heads at the desired point in the operating cycle of the take-out assembly. Workpieces being removed from the blow molder turntable are transported by the pick-up assembly into registry with an associated material handling device such as an endless belt type conveyor. The take-out assembly mechanism further includes a mechanism for enabling it to be moved away from the blow molder discharge station to enable manual removal of workpieces which is desirable during machine start up, testing modification, etc.

4 Claims, 7 Drawing Sheets

TAKE-OUT ASSEMBLY FOR BLOW MOLDING MACHINE

BACKGROUND OF THE INVENTION

This invention relates to a blow molding machine and particularly to one having an improved take-out assembly which removes workpieces from the forming molds and transports them to an associated material handling device.

Blow molding machines operate by charging a mold cavity with a parison of plastic material which is heated to a semi-fluid state, and is thereafter subjected to internal pressurization through an inserted needle causing the plastic to inflate and conform to the inside surfaces of the mold cavity. Blow molding machines are used to produce numerous types of articles and have been particularly used in making containers for beverages, household chemicals, etc.

One type of blow molding machine is referred to as a vertical turntable type and has a turntable which rotates about a horizontal axis. The turntable has a number of arms, each supporting a multi-piece mold assembly. The turntable is rotated continuosly past a number of workstations. At one workstation, components of the mold assembly are separated to expose the mold cavity. Thereafter, the mold assembly passes adjacent to a discharge nozzle of a plastic extruder which charges the mold cavity with a heated plastic parison. The mold components are then clamped together and rotated to the next workstation where a fluid (eg. air) is injected into (or evacuated from) the mold to cause the charge to expand and conform to the inside surface of the mold cavity. During continued rotation of the turntable, the mold assembly is cooled to cause the plastic material to freeze and solidify. Finally, the mold assembly is opened and the finished workpiece is removed by a take-out assembly. In accordance with the prior art, take-out devices conventionally includes a hook or rod which engages the workpiece and transports it to an associated material handling system such as a conveyor. The conveyor transports the workpiece to other workstations for flash removal, labelling, filling, etc.

Although the presently available blow molding machines operate satisfactorily, there is a need to provide such machines with an improved take-out assembly which more positively removes the workpieces and more accurately positions them with respect to an associated material handling system such as a conveyor.

SUMMARY OF THE INVENTION

In accordance with the present invention, a take-out assembly is provided which is particularly adapted for use with vertical turntable type blow molding machines. The take-out assembly according to this invention includes a turntable having a number of extending arms. At the end of each arm vacuum operated suction cups which adhere to the workpieces when a vacuum signal is provided. The arms extend and retract at the appropriate time during rotation of the turntable to properly position the suction cups to pick up and drop off the workpieces. The present take-out assembly reliably engages the workpieces and enables the workpieces to be accurately positioned upon a conveyor.

In accordance with another feature of this invention, the take-out assembly is provided with means for enabling it to be moved away from its normal operating position so that workpieces can be removed from the blow molding machine manually, which is frequently desired during machine start up, tuning, retooling etc. Rotation of the take-out assembly turntable is coordinated with rotation of the blow molding machine turntable so that the suction cups are properly oriented to engage the workpieces at the appropriate point in the production cycle.

Additional benefits and advantages of the present invention will become apparent to those skilled in the art to which this invention relates from the subsequent description of the preferred embodiments and the appended claims, taken in conjunction with the accompanying drawings.

DETAILED DESCRIPTION OF THE INVENTION

Figure 1:
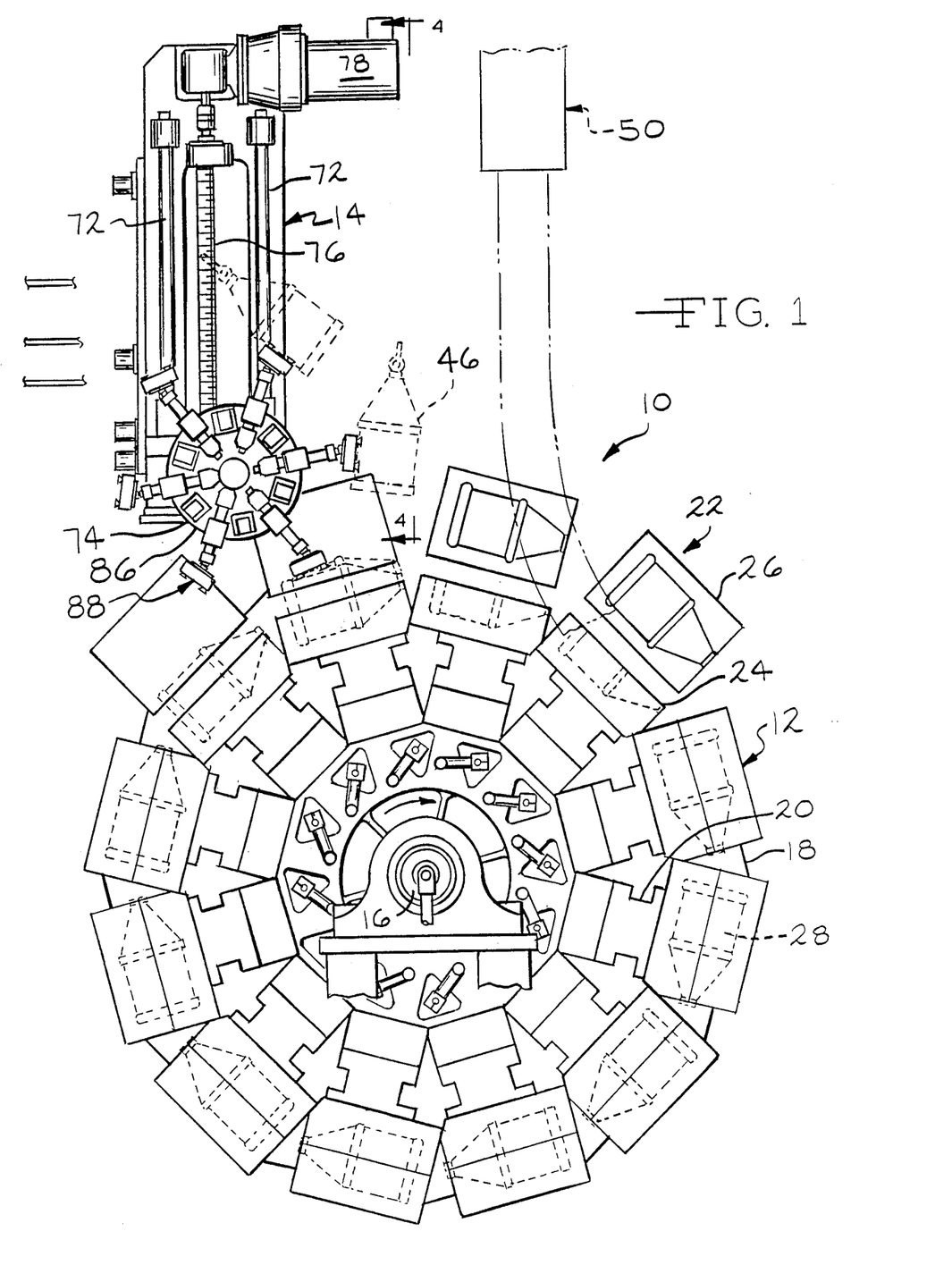
FIG. 1 is a side elevational view of a blow molding machine with an improved take-out assembly according to this invention.
Figure 2:
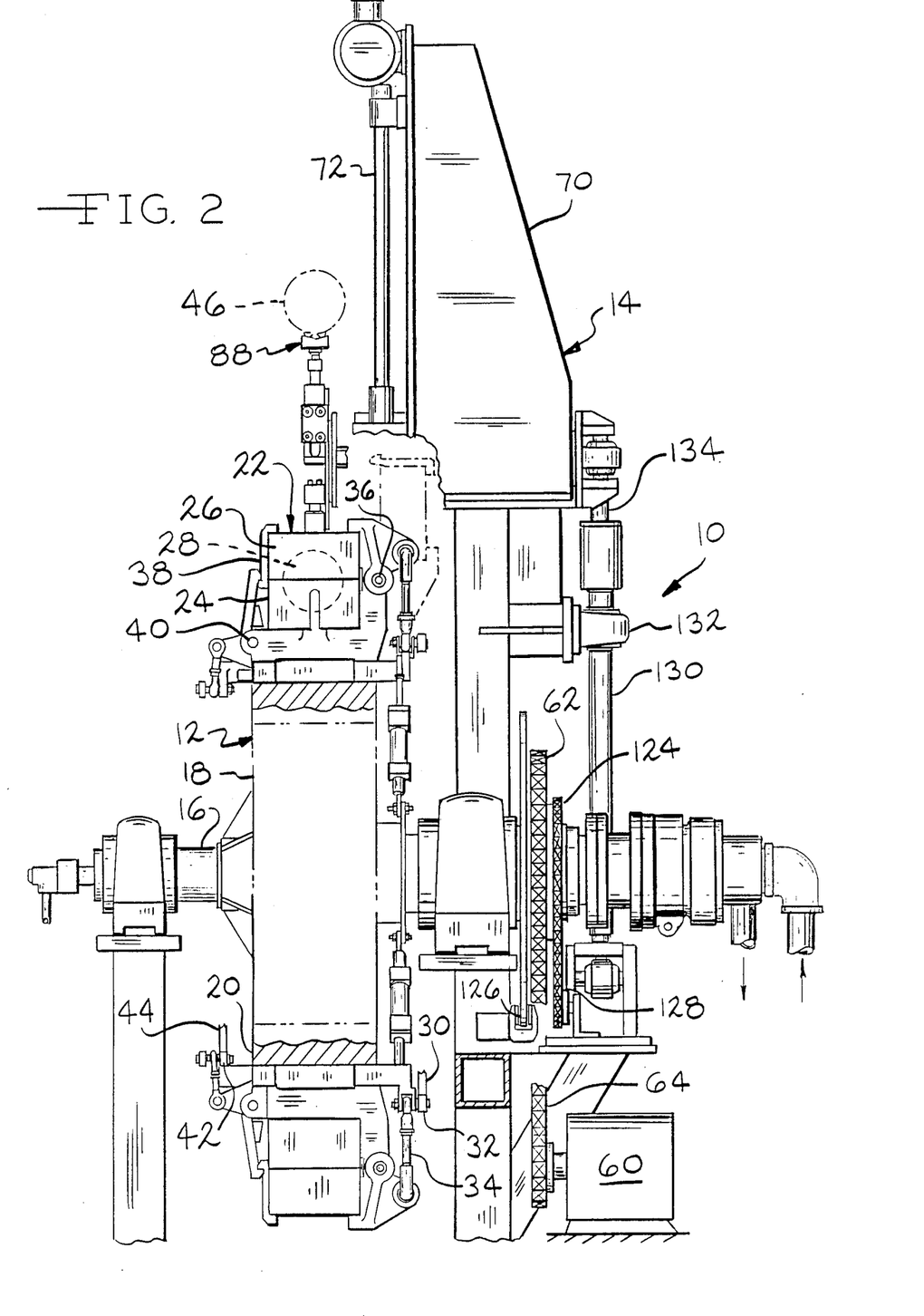
FIG. 2 is a frontal view of the machine shown in FIG. 1.
Figure 3:
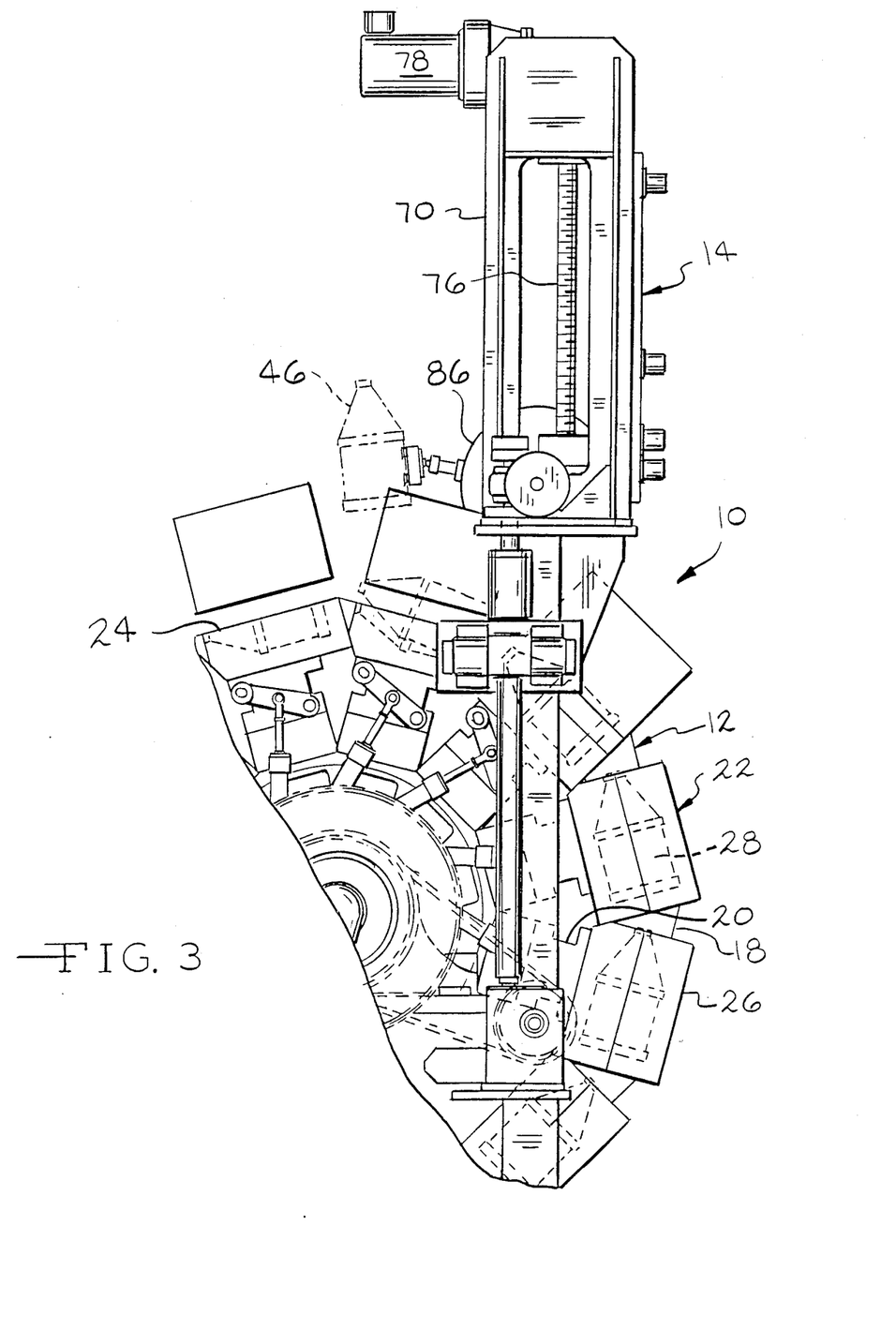
FIG. 3 is a partial rear view of the apparatus shown in FIG. 1.

A blow molding machine with an improved take-out assembly according to this invention is shown in FIGS. 1 and 2, and is generally designated by reference number 10. Machine 10 generally comprises blow molder turntable assembly 12, and take-out assembly 14.

As is best shown in FIG. 1, blow molder turntable assembly 12 rotates about a horizontal axle 16 and includes central turntable 18 with a number of radially extending mold mounting arms 20. Blow molding machine 10 is designed to rotate continuously such that turntable 18 rotates at a constant speed which does not necessitate intermittent stops as each mold assembly 22 passes the various workstations. Rotation of turntable 18 is controlled by motor 60 which drives sprocket 62 through chain 64.

At the end of each arm 20 is a two-part mold assembly 22, which has fixed portion 24 and movable portion 26. Portions 24 and 26 are connected by hinge 36 which enables movable portion 26 to be opened to expose mold cavity 28. Internal mold cavity 28 may have any number of configurations to form various workpieces. Workpieces 46 shown by the Figures is a conventional household chemical bottle such as used to contain laundry bleach.

During the production cycle, movable portion 26 of the mold assembly 22 is periodically opened to expose mold cavity 28, and closed during forming of the workpiece. The opening and closing of mold assembly 22 is controlled by cam plate 30, shown in FIG. 2, which acts on follower 32 and tie rod 34. Movement of the tie rod 34 causes movable mold portion 26 to open and close about hinge 36. Since internal mold cavity 28 is pressurized when the parison is being inflated, it is necessary to lock the mold portions together. Locking occurs by the action of latch arm 38 which rotates about pivot 40, and is moved by cam follower 42 which travels along cam plate 44. At the appropriate point in the operating cycle, as shown in FIG. 2, latch 38 moves in position to engage a surface of mold portion 26, thus locking the components of mold assembly 22 together.

Blow molding machine 10 is used with an associated plastic extrusion machine which is shown in phantom lines in FIG. 1 and is generally designated by reference number 50. Machine 50 is of conventional design and employs a rotating screw which causes frictional heating by shearing pelletized plastic raw material and discharge it through a nozzle in a heated molten state.

Figure 9:
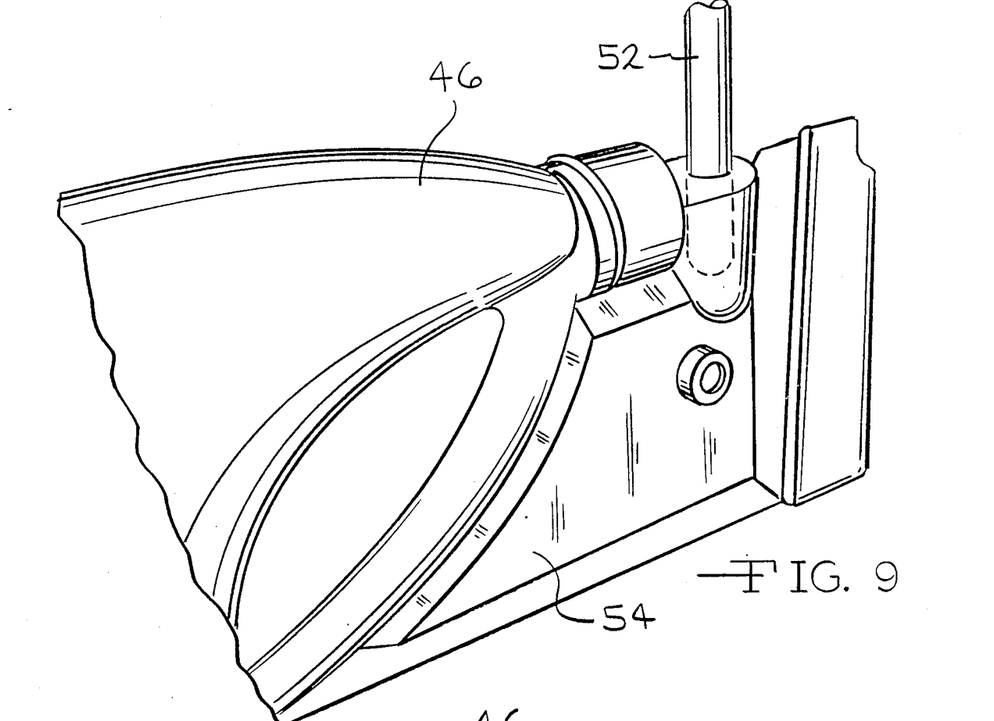
FIG. 9 is a pictorial view showing the positioning of an inflation pin within the mold cavity which supplies air for expanding the plastic parison into a fully formed workpiece (a household chemical bottle).
Figure 10:
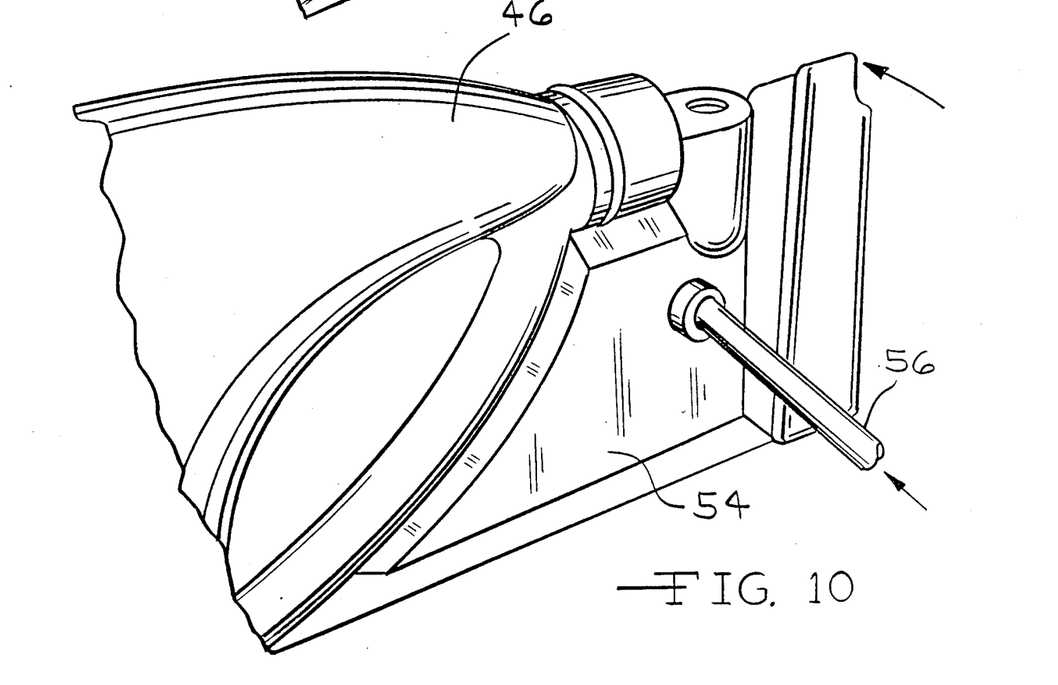
FIG. 10 is a pictorial view showing an ejection pin which acts on flash attached to the container workpiece for loosening adhesion between the workpiece and the mold, thus simplifying removal of the workpiece from the mold cavity.

During rotation of turntable 18, segments of molten plastic from extrusion machine 50 are deposited within the opened mold assemblies 22. This step occurs at about the one o'clock rotated position of turntable 18, as shown in FIG. 1. After the parison is deposited within mold cavity 28, mold assembly 22 is closed and locked, and inflation pin 52 is inserted as shown in FIG. 9. The parison expands as air is introduced through inflation pin 52 until it conforms to the internal surfaces of the mold cavity 28 which defines the final configuration of workpiece 46. As shown in FIGS. 9 and 10, mold cavity 28 forms flash portion 54 which is later trimmed away from the remainder of the workpiece in a subsequent operation.

During continued rotation of turntable 18, mold portions 24 and 26 are cooled to cause the plastic material to solidify. At approximately the ten o'clock rotated position as shown in FIG. 1, mold assembly 22 is unlocked and cam plate 30 causes movable portion 26 to open to expose workpiece 46. At approximately the eleven o'clock position, ejector pin 56 acts on flash portion 54, as shown in FIG. 10, to separate the workpiece from mold portion 24, thereby breaking adhesion between the workpiece and mold. At a subsequent step in the production process, take-out assembly 14 described in detail below removes workpieces 46 and transports them to an associated material handling system.

The details of construction of take-out assembly 14 are best explained with reference to FIGS. 1 through 8. Take-out assembly 14 is mounted to support frame 70 which is fixed with respect to the remainder of blow molding machine 10. Support frame 70 is elongated in the vertical direction and includes a pair of separated guide bars 72. Guide bars 72 enable take-out head 74 to be moved vertically from its normal working position so that workpieces may be removed from blow molding machine 10 manually. Such manual unloading is particularly desired during tuning of dies, initial startup, etc. Take-out head 74 is slideable along guide bars 72 and its positioning is set by rotation of screw 76 which is controlled by take-out positioning motor 78. Take-out head 74 has a threaded base which receives screw 76 so that it moves along the screw as it is rotated.

Shaft 80 is supported at opposite axial ends by bearing assemblies 82 and 84 of take-out head 74. Shaft 80 is hollow for the conduction of vacuum transmitting tubes, as will be described below. Turntable 86 rotates with shaft 80 and includes a plurality (six shown) of pick-up units 88. Pick-up units 88 include linear bearing 90 which enables portions of the pick-up unit to extend and retract, as desired. Shaft 92 extends through bearing 90 and has a hollow end portion which receives threaded shaft 94. Threaded shaft 94 supports pick-up head 96 which has four separated suction cups 98. Adjustment nut 102 is threaded onto shaft 94 and is received by hollow shaft 92, and enables the axial positioning of pick-up head 96 to be adjusted. Head 104 is attached to the end of shaft 92 opposite pick-up head 96. Coil spring 106 is positioned between bearing 90 and head 104 to resiliently bias shaft 92 (and pick-up head 96) in a radially inward direction, relative to turntable 86.

Figures 7, 8:
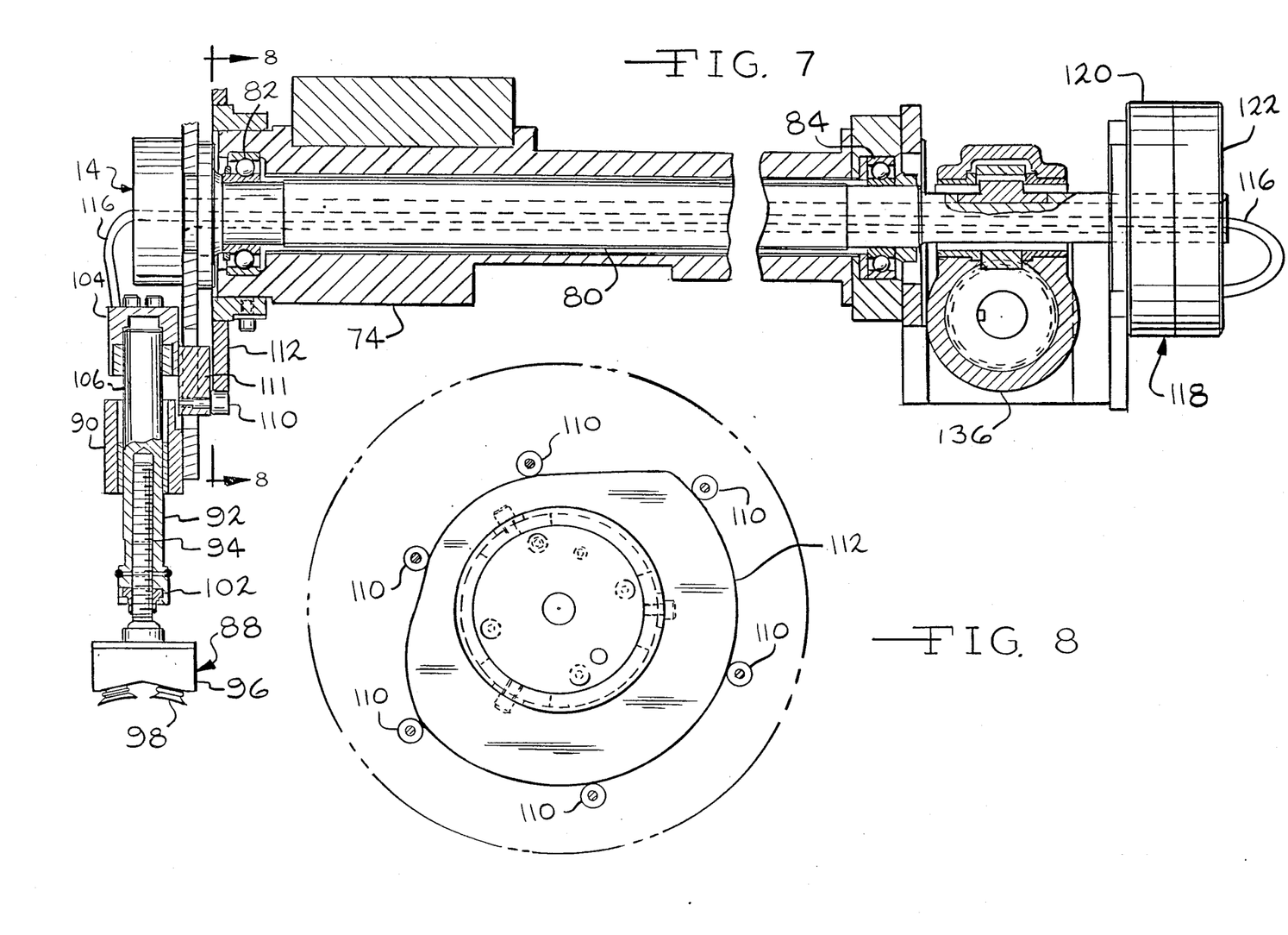
FIG. 7 is a partial rear view showing components of the take-out assembly.
FIG. 8 is a cross sectional view taken along lines 8—8 of FIG. 7 particularly showing the cam plate which controls extension and retraction of the take-out assembly pick-up heads.

The radial positioning of pick-up heads 96 is controlled through the interaction between cam followers 110 and cam plate 112, which is best shown in FIGS. 7 and 8. Each of cam followers 110 are coupled to heads 104 by links 111. Cam plate 112 is fixedly mounted with respect to take-out head 74. The positioning of cam followers 110 associated with each of the individual pick-up units 88 is shown in FIG. 8. The configuration of cam plate 112 causes pick-up heads 96 to be retracted at the position where workpieces 46 are being unloaded, and extended after the workpieces are engaged.

Suction is applied to pick-up heads 96 through flexible hoses 116 (one shown) which are held in position by blocks 114 which are mounted to turntable 86 adjacent each of pick-up units 88. Hoses 116 are routed through the internal bore of shaft 80 and communicate with rotary timing valve 118. Timing valve 118 has a fixed portion 120 and a rotating portion 122. The individual hoses 116 are connected to rotating portion 122 via radially displaced ports and a source of vacuum is connected to a port in fixed portion 120. In a well known manner, valve portions 120 and 122 have internal bores which are blocked or unblocked as they rotate relative to each other to selectively open or close the vacuum signal to appropriate hoses 116 in a timed manner, thus providing a vacuum signal to the hoses when the associated pick-up head 96 is within a predetermined range of rotated positions.

Since (in the embodiment shown) take-out assembly 14 has six take-out heads 74, and blow molding turntable 12 has twelve mold assemblies 22, it is necessary to rotate turntable 86 at twice the rate of rotation of blow molder turntable 12. In addition, it is necessary to coordinate the position of the two turntables so that the elements properly engage in a timed manner. Such coordinated rotation is provided by sprocket 124 which rotates with shaft 16 and communicates with drive gear 126 through chain 128. The rotary motion is transferred to internally splined shaft 130 which is supported by bearing 132. Since it is necessary to permit take-out head 74 to translate vertically, a smaller diameter externally splined shaft 134 interfits within shaft 130 and is rotated by drive coupling 136 which is driven by rotation of shaft 16.

Figure 4:
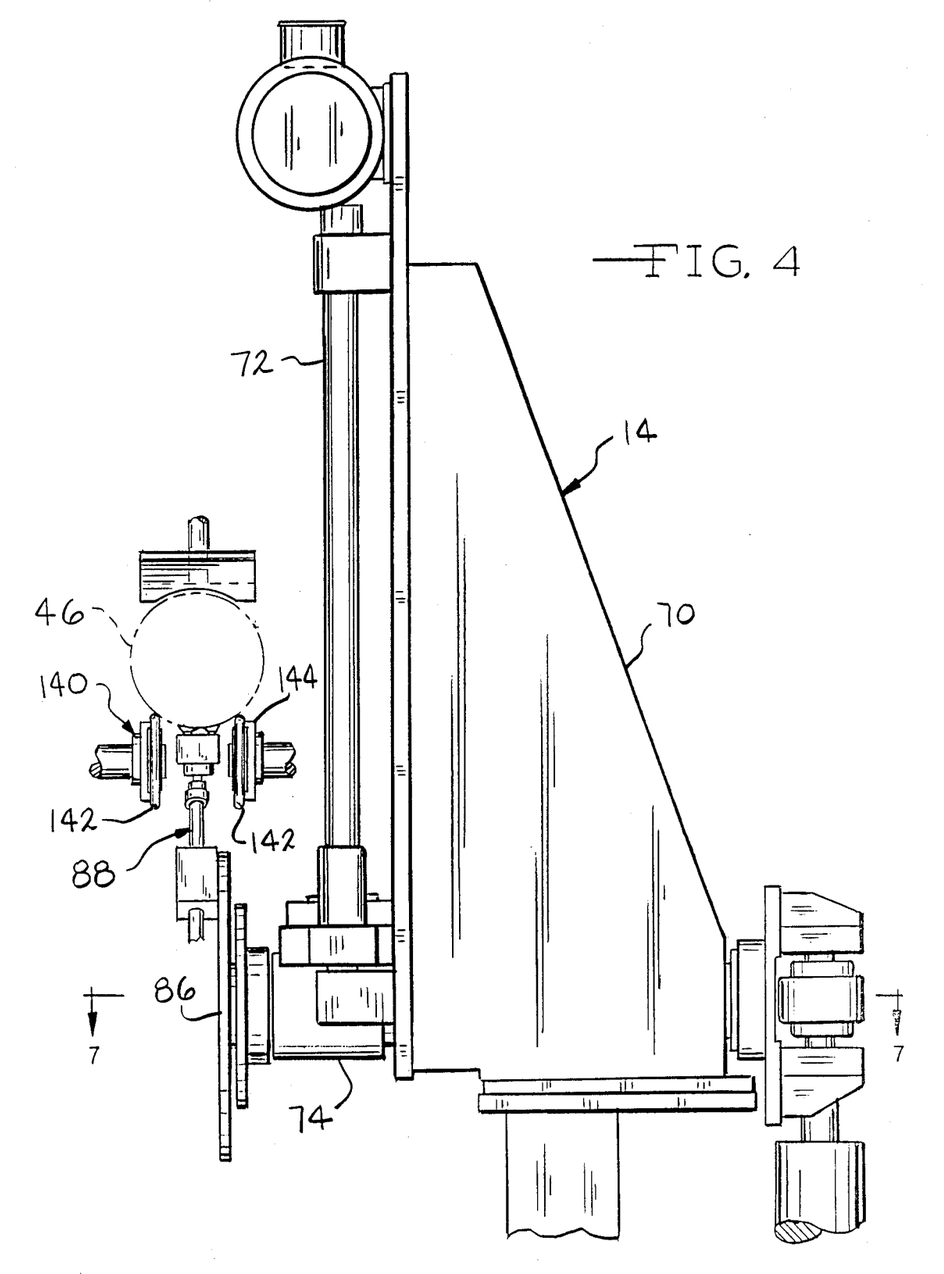
FIG. 4 is a frontal view particularly showing components of a take-out assembly according to this invention.
Figures 5, 6:
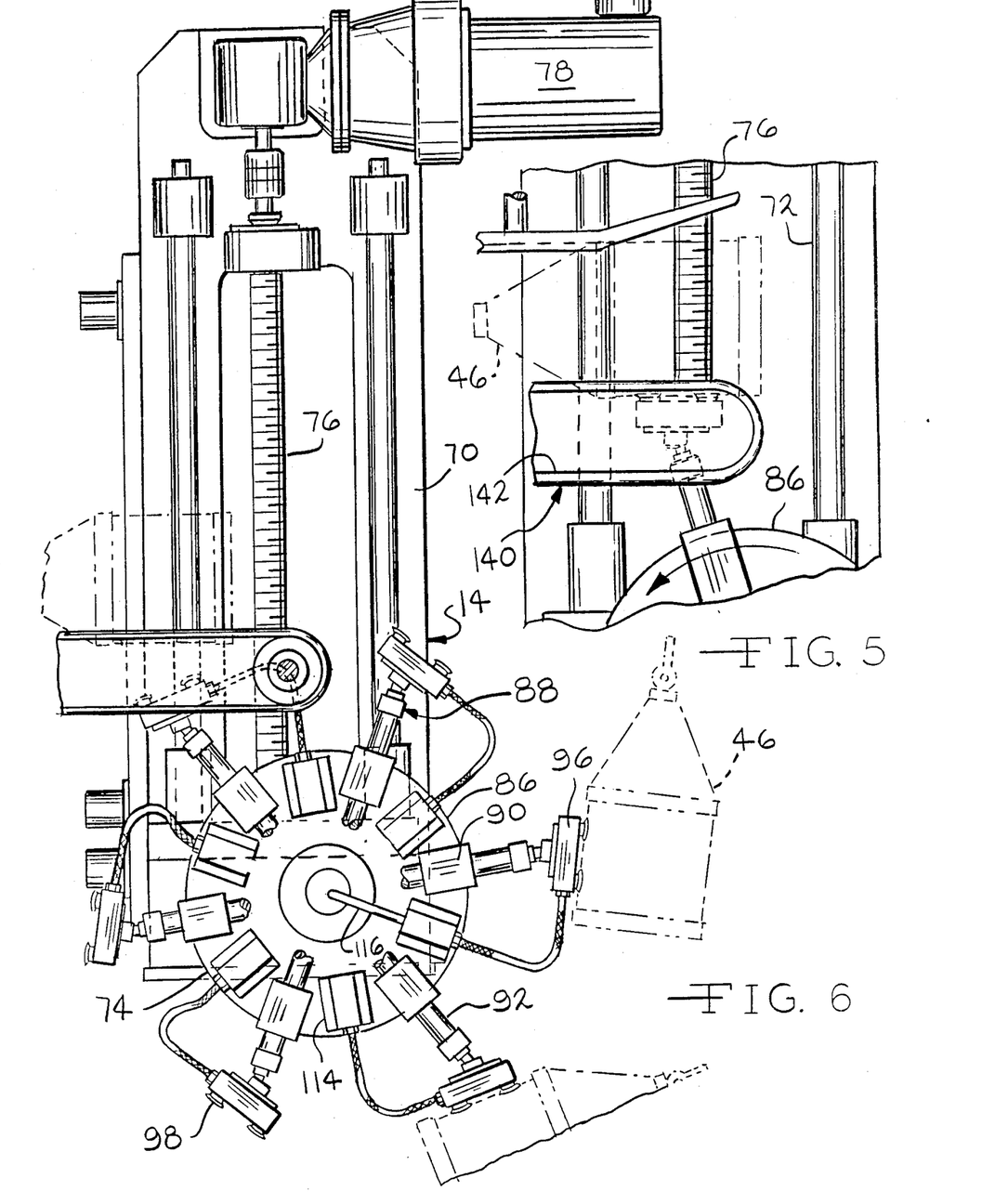
FIG. 5 is a partial front elevational view showing the take-out assembly in operation loading a workpiece onto an associated conveyor system.
FIG. 6 is another side view particularly showing an improved take-out assembly according to this invention.

Take-out assembly 14 is preferrably employed in connection with a conveyor type material transfer system which transports workpieces 46 to a subsequent work station or storage area within the work cycle of the workpieces. One such type of conveyor is shown in FIGS. 4 and 6, and is generally designated by reference number 140. Conveyor 140 has a pair of separated endless belts 142 which rotate around separated sprockets 144. Conveyor 140 defines an open central area which provides clearance for passage of pick-up units 88.

During operation of take-out assembly 14, turntable 86 is rotated in a coordinated relationship with blow molder turntable assembly 12. When workpiece 46 reaches approximately the 11 o'clock position of rotation of turntable 12, as shown in FIG. 1, cam plate 112 causes one of pick-up heads 96 to extend into close proximity with the workpiece. At that point in the rotation of turntable 86, the vacuum source is communicated to the suction cups 98 such that they adhere to workpiece 46. Thereafter, workpiece 46 is brought to an overhead position where pick-up unit 88 is positioned between conveyor belts 142. At that position, the vacuum source is disconnected from pick-up head 96 to enable the workpiece to separate from the pick-up head and be transported along conveyor 140 to a subsequent work station. After releasing workpiece 46, pick-up head 96 is retracted to provide clearance as it moves past mold assemblies 22. Each of the individual pick-up units 88 operates in the above described manner in a continuous fashion such that a pick-up head 96 is presented for each of the workpieces 46 produced by blow molder turntable assembly 12. The use of take-out assembly 14 enables the workpieces to be reliably removed from the molds and precisely positioned in registry with conveyor 140.

While the above description constitutes the preferred embodiments of the present invention, it will be appreciated that the invention is susceptible to modification, variation and change without departing from the proper scope and fair meaning of the accompanying claims.

What is claimed is:

1. A take-out assembly for removing workpieces from a blow molder of a type having a plurality of multipiece mold assemblies affixed to a molder turntable which is rotatable about a horizontal axis, said blow molder opening said mold assemblies to expose finished workpieces as said mold assembly moves through a workpiece discharge station, said take-out assembly comprising;
    a pick-up support frame,
    at least one guide rod affixed to said support frame,
    a pick-up head slideable on said guide rod,
    means for positioning said pick-up head along said guide rod, whereby said pick-up head may be moved from a first position adjacent said workpiece discharge station to a second vertically upward position displaced from said discharge station,
    a pick-up turntable carried by said pick-up head for rotation about a horizontal axis,
    means for rotating said pick-up turntable in a coordinated manner with respect to said blow molder turntable,
    a plurality of pick-up units affixed to and rotating with said pick-up turntable, said pick-up units having first and second interfitting shafts with a pick-up head coupled to one end of said first and second shafts and threaded means connecting said shafts together whereby a total length of said first and second shafts is adjustable,
    a cam plate adjacent said pick-up turntable and mounted such that said pick-up turntable rotates relative to said cam plate,
    cam followers coupled to said pick-up unit first shafts and to said camplate such that said pick-up units are extended to engage said workpieces as said pick-up units move past said workpiece discharge station and wherein adjustment of said threaded means enables the extension of each of said pick-up units to be independently adjustable to properly position each of said pick-up units to engage said workpieces,
    a source of vacuum,
    a plurality of vacuum hoses communicating with said pick-up heads, and
    a rotary timing valve having a first non-rotatable portion and a second portion carried by and rotatable with said pick-up turntable, said second portion communicating with each of said vacuum hoses and to said source of vacuum for providing a vacuum signal to said pick-up units as said pick-up units move past said workpiece discharge station to thereby adhere to said workpieces.

2. The take-out assembly according to claim 1 wherein said means for positioning said pick-up head comprises a threaded screw carried by said support frame, and said pick-up head having a threaded frame which receives said screw, and means for rotating said screw thereby causing said pick-up head to move along said guide rod.

3. The take-out assembly according to claim 1 further comprising one or more suction cups affixed to said pick-up units and communicating with said source of vacuum to engage said workpieces.

4. The take-out assembly according to claim 1 wherein said pick-up units further comprise a spring which baises said pick-up heads in a radially inward direction.

* * * * *